Oct. 4, 1960 G. V. YOUNG 2,955,157

VIDEO IMAGE FRAME RECORDING AND REPRODUCING SYSTEM

Filed Aug. 22, 1956

INVENTOR.
GEORGE V. YOUNG,
BY Norman L. Chalfin
AGENT.

United States Patent Office 2,955,157

Patented Oct. 4, 1960

2,955,157

VIDEO IMAGE FRAME RECORDING AND REPRODUCING SYSTEM

George V. Young, 4855 Imperial Highway, Inglewood, Calif., assignor of one-half to Peter J. Pohl, Manhattan Beach, Calif.

Filed Aug. 22, 1956, Ser. No. 605,674

5 Claims. (Cl. 178—6.6)

This invention relates to means for recording video images such as may be derived from television systems and more particularly to a means for recording and storing the video information contained in a single frame and/or field of a television picture or other related video signal and for subsequently reproducing the signal repetitively.

When it is desired to produce a single still image on a television image reproducing or transmitting system it is necessary at the present time to either project a motion picture film of the image, or a picture slide of the image onto a television camera device and continue to do so until the image is no longer needed. Another alternative is to train a television camera on a photograph or card containing the desired still image until the image is no longer needed.

If a still image is required which is frequently used such as a television test pattern, this can be provided by a device known as a monoscope. Such a device has a plate which is sealed within a glass envelope containing also a cathode ray beam generating system. The plate included in the envelope acts as a target for the cathode ray beam. This plate has the desired image impressed on it in such fashion that when the beam is made to scan the plate by appropriate signal circuits a video signal will be generated at the output of the monoscope corresponding to this image. The image is always the same and may never be changed without destroying the instrument.

This invention contemplates a still image recording device which provides means for receiving a predetermined sequence of video signals corresponding to a desired still picture or one frame of a monochrome, or color television picture and storing these signals on a recording medium for ready "play-back" whenever desired. The play-back may be made continuously and repetitively at any desired rate to correspond with the original rate of the original signal or it may be slowed down or speeded up at will for such purposes as it may be necessary to do so.

Examples of the utility of my invention are indicated in the following ways in which the invention may be applied in the television broadcasting field.

A camera chain or other video signal generating system is trained upon desired still images such as may be required for a program planned for later transmission. The images may be titles, commercial messages, news picture stills, test patterns or any other still image signal information. The output of the camera chain may be connected directly to my invention or the signal from the camera chain may be carried over cables, or other transmission means to a studio or may be broadcast to receiving apparatus at a remote location. In any event by any one of the well known means the video signals corresponding to the desired still image are delivered to a location at which equipment according to my invention is available and the signals are applied thereto.

The equipment of my invention in one embodiment thereof comprises a circuit means for activating the instrument at a desired instant. Immediately upon being activated the first frame synchronization pulse (vertical sync pulse) occurring thereafter gates the signals from the still image into a recording transducer which impinges a corresponding signal upon a cyclically moving recording medium. The recording medium moves at one revolution of the medium in the period of one complete frame of the television signal from the camera chain, receiving or transmitting system. In the current practice of the television art one frame of the signals involves two fields interlaced so that in a period of time between the occurrence of three successive frame synchronizing pulses commonly referred to as vertical sync pulses, one complete picture signal train is generated including all the video information signals of a single still picture.

The third vertical sync pulse, or the second pulse following after the first frame synchronizing pulse as above referred to closes the gate circuit so that no further signals are applied to the moving recording medium. Thus the signals corresponding to one frame, including the two fields are recorded on the cyclically moving recording medium.

In order to utilize the signal recorded on the moving recording medium a pickup transducer is provided and the medium is moved at a rate of speed in revolutions per minute corresponding to the number of frames, at which the video signal system where the still image is to be used is operated. This may be done at any time after recording. Any number of such systems may be used for any number of single frames. The images recorded may be from still images or from single frames selected as desired from an active television program.

Accordingly, then it is an object of this invention to provide a recording and storage system for a single frame of video image signals or signals corresponding to a single still image in such a system.

It is a further object of this invention to provide a video signal storage device for storing the signals of one frame of a video picture signal and for transcribing said stored signals repetitively at a predetermined rate.

It is another object of this invention to provide a monoscope type of device in the form of a cylically movable recording medium for storing predetermined signals corresponding to a single frame of a television picture signal and means for recording the signals on the medium and transcribing them from the medium to other signal receiving or transmitting means at predetermined rates.

It is again an object of this invention to provide a means for storing a single frame of the signal of a television program for subsequent retransmission comprising signal controlling means, a recording medium, means for applying the single frame signals on said recording medium and means for transcribing said signals from said medium.

It is yet another object of this invention to provide a flexible recording device for a single frame of the image signals in any television system wherein the recorded signals may be retransmitted at a rate widely different from the rate at which it was recorded.

It is a still further object of this invention to provide a single frame monochrome or color television signal recording and storage device including a magnetic recording drum and transducing means and circuit control means for recording thereon the signals corresponding to said single frame and means for transcribing same.

It is still another object of this invention to provide a single frame color or monochrome television signal recording and storage device including a magnetic recording tape means in the form of a continuous loop and circuit means for recording thereon the signals corresponding to said single frame and means for transcribing same.

These and other objects will become apparent from the specification which follows when considered together with the accompanying drawings and as defined in the appended claims.

Figures 1, 2, 3:
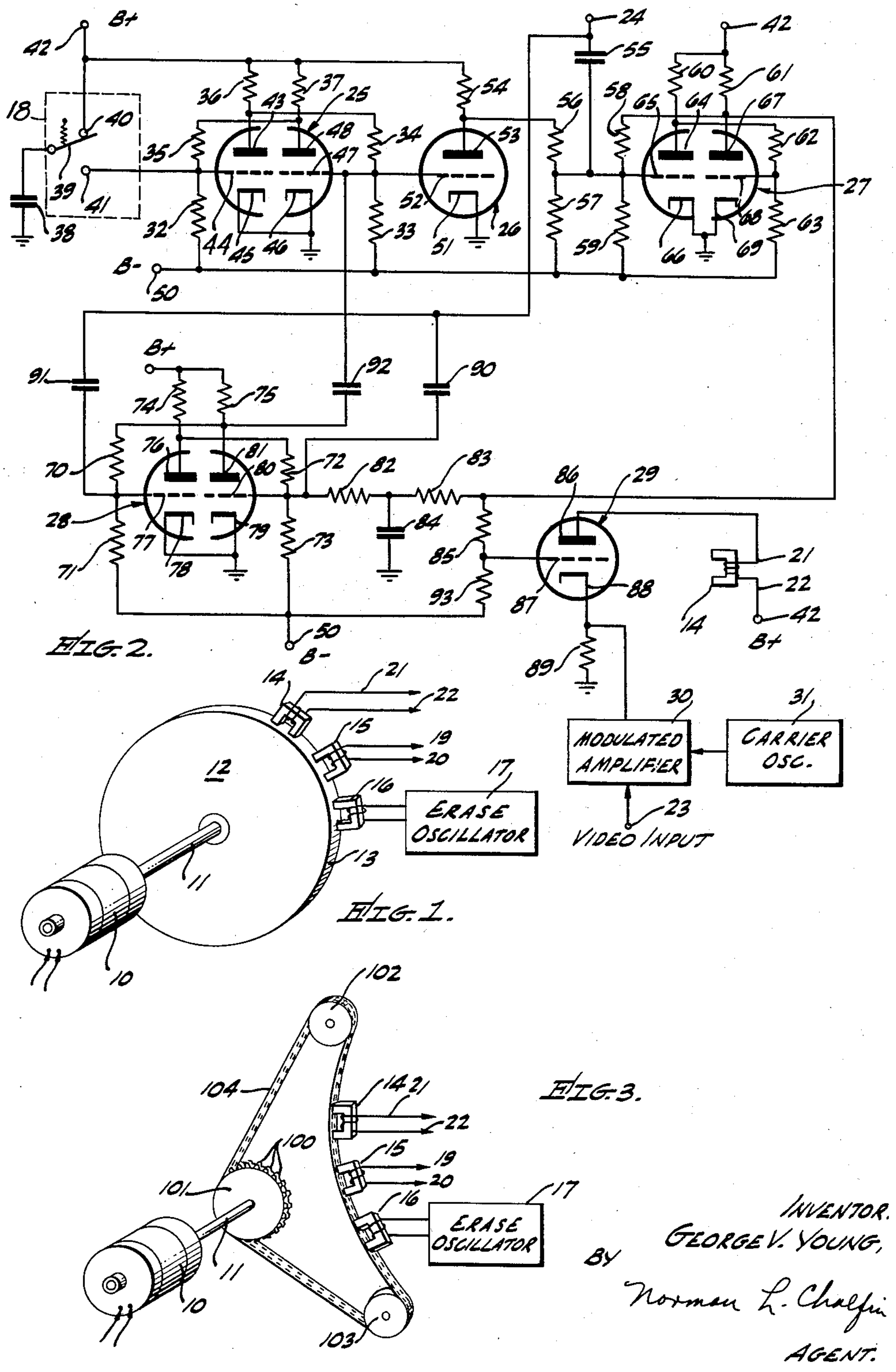
Fig. 1 is a partially schematic representation of a form of recording system according to this invention.
Fig. 2 is a schematic circuit diagram of a single frame recording control circuit used in conjunction with the recording system of Fig. 1.
Fig. 3 is a partially schematic representation of another form of recording medium according to this invention and usable with the control circuit shown in Fig. 2.

Referring now to Fig. 1 there is shown a drum 12 having a magnetic oxide impregnated surface 13 coupled to a shaft 11 of a synchronous motor 10. A recording head 14, a playback head 15 and an erase head 16 are provided positioned in recording relation to the magnetic oxide surface 13 of the drum 12. Motor 10 is adapted to synchronously drive drum 12 at a rate corresponding to one frame per revolution. Thus if a television system operating at 30 frames per second is involved the rotation rate at which drum 12 is driven by the motor 10 corresponds to 30 revolutions per second or 1800 r.p.m. In some European countries the frame frequency is 25 per second. For such use the motor drive 10 for the magnetic recording drum 12 of this invention can be made to operate at 25 r.p.s. or 1500 r.p.m. In any case the rotational speed of drum 12 is 1 revolution per frame of the signal to be recorded on the magnetic oxide coating 13.

An erase signal oscillator 17 is provided coupled to erase head 16 for providing an erase signal when it is desired to erase a signal recorded on magnetic surface 13 of drum 12. The erase signal oscillator 17 can be of any known type in general use for magnetic recording. The erase signal oscillator 17 is preferably equipped with an off-on control switch to control its operation when desired.

Playback head 15 has terminal leads 19 and 20 for connection to any video receiving system such as a television signal chain to pick up recorded signals from the magnetic surface 13 of drum 12 and retransmit these signals into a television signal circuit chain for transmission to a viewing device or for broadcast.

Record head 14 has terminal leads 21 and 22 for connection to the control circuit of Fig. 2 as described below.

Referring now to Fig. 2, the circuit for supplying video signal information for exactly one frame of a television image is shown. The circuit of Fig. 2 is connected with any external television picture signal source such as a monochrome or color television receiver, a monochrome or color television camera chain or studio monitor system by means of video input connection 23. The vertical sync signal portion of the external television picture signal source is connected to vertical sync signal input connection 24.

The vacuum tube dual triode 25 is a bistable multivibrator. Input grid 44 of multivibrator 25 is connected to a normally open terminal 41 of a switch 18 enclosed in a dashed box in Figure 2. Arm 39 of switch 18 is normally connected to terminal 40. Switch 18 is of the push button type and when depressed arm 39 will make contact with terminal 41. A capacitor 38 is connected from switch arm 39 to ground. Switch terminal 40 is connected to a source of positive potential at 42. Resistor 32 is a grid leak connected between grid 44 and a source of negative potential 50. A grid leak 33 is connected from the other grid 47 of multivibrator 25 to source of negative potential 50. Resistors 36 and 37 are connected respectively to anodes 43 and 48 of tube 25 and to source of positive potential 42. Cathodes 45 and 46 of tube 25 are connected to ground. A resistor 35 couples grid 44 to anode 48, each of different sections, of the multivibrator 25 and resistor 34 couples grid 47 with anode 43 of multivibrator 25. In this way in the absence of a triggering signal the multivibrator is maintained in a desired stable state at turn-on. For example the section of tube 25 involving anode 48 grid 47 and cathode 46 (section 1) is conducting and the other side, anode 43 grid 44 and cathode 45 (section 2) is nonconducting.

Tube 26 is an isolation amplifier. Grid 52 of tube 26 is coupled to grid 47 of tube 25. Cathode 51 of tube 26 is grounded and anode 53 of tube 26 is connected to source of positive potential 42 through anode loads resistor 54. When section 1 of tube 25 is nonconducting tube 26 is nonconducting also.

Tube 27 is also a bistable multivibrator. The connection of the tube elements of tube 27 with resistors 58 through 63 inclusive correspond to the similar connections of tube 25. A capacitor 55 is coupled between vertical sync input connection 24 and grid 65 of section 2 of tube 27. Resistances 56 and 57 form a voltage divider between anode 53 of tube 26 and negative potential source 50. The junction of resistors 56 and 57 is connected to grid 65.

Tube 28 is another bistable multivibrator. Resistors 70 through 75 inclusive are connected to tube 28 in a manner similar to tubes 25 and 27.

Anode 67 of tube 27 is coupled to grid 80 of section 1 of tube 28 through a time delay network comprising resistors 83 and capacitor 84. Resistor 82 is an isolation resistor for attenuating vertical sync pulses from 24 being applied to controlled amplifier tube 29 further described below. Anode 67 is also coupled to grid 87 of a controlled recording amplifier tube 29 through resistor 85. A grid leak resistor 93 is connected from grid 87 to source of negative potential 50.

Vertical sync input connection 24 is coupled through capacitors 90 and 91, respectively to grids 80 and 77 of tube 28. Anode 81 of section 1 of the tube 28 is coupled through capacitor 92 to grid 47 of section 1 of tube 25.

Video input connection 23 is connected to a modulated amplifier 30 of known type. A carrier oscillator 31 of known type is coupled to modulated amplifier 30. Modulated amplifier 30 is coupled to cathode 88 of amplifier 29. The carrier oscillator 31 provides a video carrier frequency that is modulated by the video signals in modulated amplifier 30 to provide a video modulated carrier signal to the recording system of this invention.

Recording head 14 (Fig. 1) is coupled by its leads 21 and 22 between anode 86 of amplifier 29 and source of positive potential 42.

The circuit in Fig. 2 and described as above, is for the purpose of controlling the application of video information for the period of duration of exactly one frame to the recording head 14. Amplifier tube 29 is normally nonconducting. It is made conductive by the application of the positive going rectangular pulse generated by tube 27 in response to the first vertical sync pulse to arrive at 24 following the operation of start switch 18. Thus video signals are applied to recording head 14. Recording ceases on the occurrence of the third vertical sync pulse to arrive at 24 following the operation of start switch 18. The latter (3rd sync) pulse terminates the rectangular pulse generated by tube 27. In the quiescent condition capacitor 38 is connected between B+ (42) and ground through the elements 39 and 40 of switch 18. At this time tube 25 section 1 (46, 47, 48) is conducting.

When it is desired to record a picture signal, switch 18, which may be a push button, is depressed, discharging capacitor 38 through resistor 32 by closing terminals 39 and 41, creating a sharp positive pulse on grid 44. The discharge pulse from capacitor 38 cannot be repeated without releasing the switch 18 so as to recharge capacitor 38. Switch 18 must then be operated again. This renders the second tube section (43, 44, 45) of bistable multivibrator 25 conducting. The first section of tube 25 is cut off and isolation stage 26 is also cut off. Positive vertical sync pulses associated with the picture signal which is to be recorded from the external source previously described are continually applied through capacitor 55 to grid 65 of tube 27 but when tube 26 is conducting, the bias on grid 65 is sufficiently beyond cutoff so that the vertical sync pulses do not cause conduction in first section (64, 65, 66) of tube 27. However, when tube 26 is not conducting, a vertical sync pulse will cause conduction in the first section of tube 27. Thus the first vertical sync pulse to appear at 24 after switch 18 is operated will render the first section (64, 65, 66) of bistable multivibrator 27 conducting and succeeding positive sync pulses will have no effect. When the first section of tube 27 becomes conducting the second section (67, 68, 69) of tube 27 is cut off and its plate voltage rises. This rise in voltage is applied through time delay circuit 83, 84 to the grid 80 of tube 28 to bring grid 80 just below the anode current cut off value. The time delay established by 83, 84 is longer than a vertical sync pulse, but shorter than the interval between two pulses. Tube 28 therefore acts as a binary counter stage rendered operative by the rise in plate voltage (plate current cut off) of the second section (67, 68, 69) of tube 27. The vertical sync pulses are continuously applied to both grids 80 and 77 of tube 28 but the high bias on grid 80 normally holds this section beyond anode current cut off. The first sync pulse after activation of tube 28 by tube 27 will cause the first section (79, 80, 81) of tube 28 to become conducting and the sync pulse after that will cause tube 28 to resume its original state in which the first section (79, 80, 81) is not conducting. This last transition in tube 28 causes a positive pulse to be transferred through capacitor 92 to grid 47 of multivibrator 25 and through isolation stage 26 to grid 65 of multivibrator 27 to return multivibrators 25 and 27 to their original quiescent states and no further action will take place until switch 18 is again operated.

The plate voltage of the second section (67, 68, 69) of tube 27 is high during the interval from the first to the third vertical sync pulses following closing of switch 18 and this voltage applied to tube 29 places tube 29 in a conducting state during this interval. Thus, for the period of one frame while the plate voltage of tube 27, second section, is high the modulated oscillations appearing modulated amplifier 30 are applied through tube 29 as signal current flow through the record head 14.

Tube 29 is thus a controlled recording amplifier which is started in conductive operation with the first of a series of vertical television sync pulses and conduction is terminated at the third of this series of pulses.

When tube 29 is conductive the video signal which is applied at 23 to modulator 30 which is continually modulating the output of carrier oscillator 31, appears at the cathode 88 of tube 29 as a composite video signal modulated carrier. This modulated carrier signal is applied to recording head 14 for the duration of the conductive period. Recording head 14 in contact with drum 12 at magnetic oxide surface 13 impresses the carrier signal with the video modulation on the magnetic oxide as a varying magnetic flux. The varying magnetic flux becomes a permanent record on the surface 13. The recording continues only as long as the second section of tube 27 is nonconducting. The recorded signal may be played back when playback head 15 is brought into contact with surface 13 of drum 12, the head thus producing a signal corresponding to the original video signal recorded on the drum surface. This signal may be applied to any television system as a repetitive "still" picture signal of the recorded single television picture frame.

The reason for using a carrier for the recording signal is that at the tape speeds necessary for operation of this system low frequency signals as such would not be recorded because the wavelength of the low frequency signal is greater than the length of the portion of a practically dimensioned recording or playback head in contact with loop 104 or surface 13 of drum 12. The system will however respond to the amplitude variation corresponding to the modulation of the carrier oscillator by the video signal.

In Fig. 3 to which reference is now made, there is shown another embodiment of my invention incorporating a flexible tape or film loop 104 shown in semi-schematic form with a capstan drive 101 having teeth 100. A motor 10 corresponding to that shown in Fig. 1 is arranged to drive capstan 101 through shaft 11. Idlers 102 and 103 are provided so that tape loop 104 may be maintained at some desired degree of tautness in its continuous travel. If tape 104 should be magnetic tape then there may be provided a recording head 14 connected as shown previously by leads 21 and 22 to the anode and B+ connections of tube 29 as shown in Fig. 2. Also a playback head 15 is provided similar to that shown and described in Fig. 1 and erase head 16 with its erase oscillator 17.

In using the system of my invention as shown in Figs. 1, 2, and 3 and described in the foregoing paragraphs, the system may be connected up as a single track system or as a plural track system. As a single track system only one playback record and erase system such as 14, 15, 16 etc. are needed. In a plural track system a plurality of adjacent tracks may be recorded on a single drum such as 12 of Fig. 1 or a tape such as 104 of Fig. 3. A plurality of record, playback, and erase heads such as 14, 15 and 16 equal in number to the number of tracks to be recorded would be provided.

In the use of the plural track system each of the record heads 14 may be connected up to a timing control and selection system such as shown in Fig. 1 which would so arrange the control and selection of recording from signal information for each track on the drum or tape that, for example, one frame out of each ½ second or some shorter or longer intervals, as desired, will be recorded. Well known circuits may be provided for recycling the system in such fashion that several, say four, frames in a sequence may be recorded for subsequent playback. Such a use in contemplated for televising of a fast action event such as a baseball or football game or a boxing match. During the course of the game or match a full television frame signal at some predetermined interval can be recorded on a selected group of the plurality of tracks, each track in sequence, so that the first of a sequence of frames is caused to be recorded and stored on the first of the plurality of tracks, followed by a succeeding frame occurring, say, ½ second later recorded on a second track while the first track with its stored signal runs idly, retaining the first frame, a third frame is recorded on a third track while track one, and track two run idly with the recorded frames stored on them and so on through as many tracks as the system has had set up for this purpose. Where the last of the plurality of tracks has had a frame signal recorded on it, the first is erased and in the next half second interval the next following frame to be selected is recorded as described above.

At any desired time in this sequence of frame recording and storage operations the user may stop the recording and erasing process thereby to hold a particular sequence "in storage" on the tracks until an intermission or other period when any desired one of the sequence of frames stored may be "played back" repetitively to give a still image of that frame on the television program while the commentator discusses the action, thus "frozen" in the selected frame signal track on the tape or drum.

Another use contemplated for systems according to my invention involves the recording of one frame of a composite sync signal with no video information present. When this signal is played back at a repetition rate corresponding to that of the television system in which it is being used, a signal is available for use as a primary source of composite sync signals in television circuit synchronizing systems or television receiver synchronizing systems, because the only signals present on the one frame record are vertical and horizontal synchronizing pulses, the blanking pulses, and equalizing pulses.

A similar use involves the recording of a single frame signal of a television test pattern, on a tape such as 104 or on the recording surface 13 of a drum such as 12, with a system as in Fig. 2, according to this invention, and then using the tape or drum with a playback head such as 15 connected to the video amplifier of a television system—either receiving or transmitting, and further using (playing back) the signal indefinitely. By playing the drum record back at a repetitive rate corresponding to the frame frequency of the system the signal of the test pattern may be used in exactly the same way in the manner of a monoscope, as described in the introduction to this specification. In using my invention several advantages are gained. Changing the test pattern from time to time is a simple matter particularly when test patterns contain advertising matter, as they sometimes do.

The station break announcement of a television station call letters can be made in the monoscope type of use of the system of this invention as described above. Here a card is placed before a television camera. The card contains the desired legend. It is televised by the camera and the output of the camera applied to circuits as in Fig. 2, above, to record one frame signal optionally with all control synchronizing and blanking pulses on the recording surface 13 of a drum such as 12. The recorded signal corresponding to the video signals of the image of the card may then be played back whenever needed at the repetition rate of the frame frequency of the television system for which it is intended.

If a new message is to be included in the station call announcement card—the drum is "erased" and the new signal recorded as described above. Thus the system may be used again and again as needed—or the recorded drum may be stored indefinitely for future use, and a new one set up for subsequent usage.

The system of this invention may even use a color television signal train for the recording of a single frame. It is clear that from the electrical recording standpoint the use of my invention is limited only by the limits of existing television signal systems.

In producing a color signal a color subcarrier is derived from the frame frequency which is derived from the local power line frequency source. In recording and reproducing a color video signal the frequency relationship between the color carrier and horizontal and vertical scanning rates is maintained by the simultaneous recording and reproduction of these signals.

The recorded composite video signal may contain a color subcarrier and color sync burst, thus allowing the playback picture to be reproduced in color. (This condition would be fulfilled if the composite video from the video detector of a color TV receiver were applied to the recorder of this invention when the receiver was tuned to a color program or test pattern.)

The recording and playback speeds may be different. For example, the signal of a conventional television broadcast picture may be recorded at one revolution of the recording medium ($\frac{1}{30}$ of a second) and played back at any slower rate as one revolution per minute. The frequencies present in the played-back picture of the example would thus be reduced by a factor of 1800 and the picture could be transmitted over a narrow band transmission facility such as a telephone circuit.

The recording may be done slowly, and the playback may be rapid. This would be desirable in order to present a picture transmitted over narrow band transmission facilities as above described on a conventional television persistence picture tube. If the picture were scanned at 1 frame per minute and played back at 30 frames per second, the playback could be shown on a cathode ray tube with a phosphor with an apparently continuous picture present.

Use of the system of this invention also provides a means of storing video information on a magnetic drum such as 12, 13 by means of storing a modulated carrier such as may appear at cathode 88 of tube 29. This allows the full video signal with its low frequency components to be stored without the necessity of extreme low frequency response in the playback apparatus.

The magnetic drum 12 may have a soft surface supporting the recording medium 13. This allows the recording and playback heads (14 and 15) to remain in continuous contact with the magnetic recording material 13 during rotation, resulting in improved high frequency response and providing for more economical construction.

A single set of heads such as 14, 15, 16 may be provided assembled on a drive screw which makes them movable across the drum surface 13 or tape surface 104. In this way the system may be used to record and playback several different single frame picture signals, with only one set of heads. Alternatively the drum surface 13 or tape surface 104 may be in contact or proximity with several sets of record-playback-erase heads such as 14, 15, 16 to allow recording of several pictures on different tracks.

The device of this invention may be used in conjunction with a conventional closed circuit television chain, as previously described. Such a system can be used by motion picture studios to present to the director or producer still pictures of scenes (known to the motion picture trade as rushes) instantaneously.

In place of drum 12 or tape 104 an optical system may be used. There a light galvanometer would replace recording head 14 and a photocell for pickup 15. The corresponding optically sensitized surface to drum surface 13 would be maintained in a light-tight closed system. It would be necessary to develop this sensitized surface before use.

There has been described above a system for recording and storing the signals present in a single frame of a television picture signal and for reproducing the signals of the single frame repetitively at will to provide a single "still" picture thereof. A variety of uses of the system have been described.

What I claim as new is:

1. A system for recording and reproducing a single frame of the signals in a television system wherein composite video signals and sync pulses are produced, said recording and reproducing system comprising: a cyclically movable recording medium; motive means coupled to said medium and adapted to move said medium at a rate of one cycle in the time period which corresponds to the duration of one frame of the signals in the television system; a recording transducer means; a playback transducer means; said transducers each being fixedly positioned in operative relation to and coupled with said movable recording medium, said transducers being also coupled to the television system; a normally nonconducting recording amplifier means coupled to the television system and to said recording transducer means for receiving the composite video signals and impressing said video signals on said recording medium; and a selectively operable control circuit coupled to the sync pulse circuits of the television system and to said recording amplifier, said control circuit including circuit means adapted to be responsive to predetermined sync pulses from said sync pulse circuits for generating a rectangular gating pulse and applying said gating pulse to said recording amplifier to render said amplifier conductive, said gating pulse being initiated by the sync pulse at the start of a selected single frame of the signals in the television system applied to said control circuit; said gating pulse being terminated by the sync pulse at the start of the next following frame of the signals in the television signal applied to said control circuit, whereby when said control circuit is energized said recording amplifier is selectively rendered conducting for the duration of one frame of the signals in the television system to record only the signals of said one frame on said recording medium, and whereafter the signals recorded on said medium may be played back repetitively through said playback transducer means as a still picture in said television system.

2. A system for recording and reproducing a single frame of the signals in a television system wherein composite video signals and sync pulses are produced, said recording and reproducing system comprising: a cyclically rotatable magnetic recording medium; motive means coupled to said medium and adapted to rotate said medium at a rate of one cycle in the time period which corresponds to the duration of one frame of the signals in the television system; a magnetic recording transducer; a magnetic playback transducer; said transducers each being fixedly positioned in operative relation to and coupled with said movable recording medium; said transducers being also coupled to the television system; a normally nonconducting recording amplifier means coupled to the television system and to said magnetic recording transducer for receiving the composite video signals and impressing said video signals on said recording medium; and a selectively operable control circuit coupled to the sync pulse circuits of the television system and to said recording amplifier, said control circuit including circuit means adapted to be responsive to the sync pulses for generating a rectangular gating pulse and applying said gating pulse to said recording amplifier to render said amplifier conductive, said gating pulse being initiated by the starting sync pulse of a selected single frame of the signals in the television system applied to said control circuit; said gating pulse being terminated by the starting sync pulse of the next following frame of the signals in the television sync signal applied to said control circuit, whereby when said control circuit is energized said recording amplifier is selectively rendered conducting for the duration of one frame of the signals in the television system to record only the signals of said one frame on said magnetic recording medium, and whereafter the signals recorded on said magnetic recording medium may be played back repetitively through said magnetic playback transducer means as a still picture in said television system.

3. A system for recording and reproducing a single frame of the signals in a television system wherein composite video signals and sync pulses are produced, said recording and reproducing system comprising: an optically-sensitive recording medium; motive means coupled to said medium and adapted to move said medium at a rate of one cycle in the time period which corresponds to the duration of one frame of the signals in the television system; an optical recording transducer; an optical playback transducer; said transducers each being fixedly positioned in operative relation to and coupled with said movable recording medium; said transducers being also coupled to the television system; a normally nonconducting recording amplifier means coupled to the television system and to said recording transducer for receiving the composite video signals and impressing said video signals on said recording medium; and a selectively operable control circuit coupled to the sync pulse circuits of the television system and to said recording amplifier, said control circuit including circuit means adapted to be responsive to the sync pulses for generating a rectangular gating pulse and applying said gating pulse to said recording amplifier to render said amplifier conductive, said gating pulse being initiated by the starting sync pulse of a selected single frame of the signals in the television system applied to said control circuit; said gating pulse being terminated by the starting sync pulse of the next following frame of the signals in the television signal applied to said control circuit, whereby when said control circuit is energized said recording amplifier is selectively rendered conducting for the duration of one frame of the signals in the television system to record only the signals of said one frame on said recording medium, and whereafter the signals recorded on said medium may be played back repetitively as a still picture in said television system.

4. A system for recording and reproducing a single frame of the signals in a television system comprising: a cyclically movable recording medium; motive means coupled to said medium and adapted to move said medium at a rate of one cycle per frame of the signals in the television system; a plurality of recording transducers; a plurality of playback transducers; a plurality of erasing transducers, said transducers each being fixedly positioned in operative relation to and coupled with said movable recording medium; said recording and playback transducers being also coupled to the television systems; a transducer selection system; a normally nonconducting recording amplifier means coupled to the television system and to said transducer selection system for receiving signals of said television system and impressing the signals on a selected area of said recording medium; and a selectively operable control circuit coupled to the sync circuits of the television system and to said recording amplifier, said control circuit including circuit means adapted to be responsive to the signals in the television system for generating a rectangular gating pulse and applying said gating pulse to said recording amplifier to render said amplifier conductive, said gating pulse being initiated by the starting pulse of the single frame of the signals in the television system applied to said control circuit; said gating pulse being terminated by the starting pulse of the next following single frame of the signals in the television signal applied to said control circuit, whereby when said control circuit is energized said recording amplifier is selectively rendered conducting for the duration of one frame of the signals in the television system to record only the signals of said one frame on said selected area of said recording medium, and whereafter the signals recorded on said medium may be selectively played back repetitively as a selected still picture in said television system.

5. A system for recording, storing and reproducing a single frame of the picture signals of a television system comprising: a movable recording medium; motive means coupled to said medium and adapted to move said medium; a recording transducer; a playback transducer; said transducers each being fixedly positioned in operative relation to and coupled with said movable recording medium; said transducers being also electrically connected to the television system; a recording amplifier means connected to the television system and to said recording transducer for receiving the composite video signals of the television system and impressing said video signals on said recording medium; and a selectively operable control circuit connected to the vertical sync circuits in the television system and to said recording amplifier, said control circuit including circuit means adapted to be responsive to the vertical sync signals of the television system for generating control pulses and applying said control pulses to said recording amplifier to render said amplifier operative, said control pulses being initiated by frame synchronizing signals of the selected single frame of the signals in the television system applied to said control circuit; said control pulses being terminated by succeeding synchronizing signals of the next following frame of the signals in the television system applied to said control circuit, whereby when said control circuit is energized said recording amplifier is selectively rendered conducting for the duration of one frame of the signals in the television system to record only the signals of said one frame on said recording medium, and whereafter the signals recorded on said medium may be played back repetitively as a still picture in said television system.

References Cited in the file of this patent

UNITED STATES PATENTS

| | | |
|---|---|---|
| 2,517,808 | Sziklai | Aug. 8, 1950 |
| 2,698,875 | Greenwood | Jan. 4, 1955 |
| 2,860,179 | Blackstone | Nov. 11, 1958 |